United States Patent
Tsunogae et al.

(10) Patent No.: US 11,981,773 B2
(45) Date of Patent: May 14, 2024

(54) RING-OPENED COPOLYMER

(71) Applicant: ZEON CORPORATION, Tokyo (JP)

(72) Inventors: Yasuo Tsunogae, Tokyo (JP); Shingo Okuno, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 783 days.

(21) Appl. No.: 17/050,239

(22) PCT Filed: Apr. 11, 2019

(86) PCT No.: PCT/JP2019/015775
§ 371 (c)(1),
(2) Date: Oct. 23, 2020

(87) PCT Pub. No.: WO2019/208239
PCT Pub. Date: Oct. 31, 2019

(65) Prior Publication Data
US 2021/0230357 A1    Jul. 29, 2021

(30) Foreign Application Priority Data

Apr. 24, 2018  (JP) ................................ 2018-083021

(51) Int. Cl.
*C08G 61/08*    (2006.01)
(52) U.S. Cl.
CPC .................................. *C08G 61/08* (2013.01)
(58) Field of Classification Search
CPC . G03F 7/11; G03F 7/094; G03F 7/168; C08G 61/08; C08G 2261/228; C08G 2261/3325; C08G 2261/418; C09D 165/00
See application file for complete search history.

(56) References Cited

U.S. PATENT DOCUMENTS

| 5,087,677 A | 2/1992 | Brekner et al. |
| 2015/0218328 A1 | 8/2015 | Smit et al. |
| 2016/0002382 A1 | 1/2016 | Tsunogae et al. |
| 2018/0244837 A1 | 8/2018 | Nitadori et al. |

FOREIGN PATENT DOCUMENTS

| JP | H06-248116 A | 9/1994 |
| WO | 2013/153901 A1 | 10/2013 |
| WO | 2014/026865 A1 | 2/2014 |
| WO | 2014/133028 A1 | 9/2014 |
| WO | 2017/051819 A1 | 3/2017 |

OTHER PUBLICATIONS

Jul. 9, 2019 International Search Report issued in International Patent Application No. PCT/JP2019/015775.
Feb. 9, 2022 Extended European Search Report issued in Patent Application No. 19791646.3.
Jan. 16, 2024 Office Action issued in European Patent Application No. 19 791 646.3.

*Primary Examiner* — Shane Fang
(74) *Attorney, Agent, or Firm* — Oliff PLC

(57) ABSTRACT

A ring-opened copolymer including structural units derived from a norbornene compound having a specific structure and structural units derived from a monocyclic olefin, wherein the proportion of the structural units derived from a norbornene compound is 25 to 90 wt % and the proportion of the structural units derived from a monocyclic olefin is 10 to 75 wt % relative to the total repeating structural units in the ring-opened copolymer, the weight average molecular weight of the ring-opened copolymer is 100,000 to 1,000,000, and the cis/trans ratio of the ring-opened copolymer is 0/100 to 50/50.

16 Claims, No Drawings

RING-OPENED COPOLYMER

TECHNICAL FIELD

The present invention relates to a ring-opened copolymer, in particular, a ring-opened copolymer which provides a cross-linked rubber excellent in all of mechanical strength, elongation properties, and rebound resilience. The present invention also relates to a rubber composition obtained by using such a ring-opened copolymer and a cross-linked rubber obtained by using the rubber composition.

BACKGROUND ART

It is generally known that ring-opening metathesis polymerization of cyclopentene and a norbornene compound in the presence of a so-called Ziegler-Natta catalyst consisting of a compound with a transition metal of Group 6 of the periodic table, such as $WCl_6$ or $MoCl_5$, and an organic metal activator, such as triisobutylaluminum, diethylaluminium chloride, or tetrabutyltin, affords an unsaturated linear ring-opened polymer.

For example, Patent Document 1 discloses a ring-opened copolymer which is prepared from cyclopentene and a norbornene compound, contains 40 to 90 wt % of cyclopentene-derived structural units and 10 to 60 wt % of norbornene compound-derived structural units relative to the total repeating structural units in the copolymer, and has a weight average molecular weight (Mw) of 200,000 to 1,000,000.

According to the technique of Patent Document 1, a product of ring-opening polymerization of cyclopentene with a norbornene compound can provide a cross-linked rubber having improved wet grip performance and low heat built-up. However, Patent Document 1 includes no discussion on how to achieve mechanical strength, elongation properties, and rebound resilience balanced at a high level as properties required for rubber soles.

RELATED ART DOCUMENTS

Patent Documents

Patent Document 1: International Publication No. WO 2014/133028

SUMMARY OF THE INVENTION

Problem to be Solved by the Invention

In view of the above issue, the present invention is aimed at providing a ring-opened copolymer which can provide a cross-linked rubber excellent in all of mechanical strength, elongation properties, and rebound resilience, a rubber composition obtained by using such a ring-opened copolymer, and a cross-linked rubber obtained by using the rubber composition.

Means for Solving the Problem

As a result of intensive studies to achieve the above purpose, the present inventors have found that a cross-linked rubber having mechanical strength, elongation properties, and rebound resilience balanced at a high level can be obtained by using a ring-opened copolymer which contains predetermined proportions of structural units derived from a norbornene compound having a specific structure and structural units derived from a monocyclic olefin in the ring-opened copolymer and has a weight average molecular weight and a cis/trans ratio within specific ranges. This finding has led to the completion of the present invention.

Specifically, the present invention provides a ring-opened copolymer comprising structural units derived from a norbornene compound represented by General Formula (1) below and structural units derived from a monocyclic olefin, wherein relative to the total repeating structural units in the ring-opened copolymer, the proportion of the structural units derived from a norbornene compound is 25 to 90 wt %, and the proportion of the structural units derived from a monocyclic olefin is 10 to 75 wt %, the weight average molecular weight of the ring-opened copolymer is 100,000 to 1,000,000, and the cis/trans ratio of the ring-opened copolymer is 0/100 to 50/50,

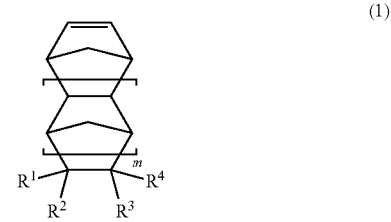

wherein $R^1$ to $R^4$ are each a hydrogen atom, a linear hydrocarbon group having 1 to 20 carbon atoms, or a substituent containing a halogen atom, a silicon atom, an oxygen atom, or a nitrogen atom, and "m" is 0 or 1.

The ring-opened copolymer preferably has a glass transition temperature of −70 to 10° C.

In General Formula (1), "m" is preferably 0.

In General Formula (1), $R^1$ to $R^4$ are each preferably a hydrogen atom or an alkyl group having 1 to 3 carbon atoms.

The monocyclic olefin is preferably at least one selected from the group consisting of cyclopentene, cyclohexene, cycloheptene, and cyclooctene.

The present invention also provides a rubber composition comprising the ring-opened copolymer.

The rubber composition according to the present invention preferably further comprises a cross-linking agent.

The present invention further provides a cross-linked rubber obtained by cross-linking the rubber composition.

Effects of Invention

The present invention can provide a ring-opened copolymer which can provide a cross-linked rubber excellent in mechanical strength, elongation properties, and rebound resilience. The present invention can also provide a rubber composition obtained by using such a ring-opened copolymer and a cross-linked rubber obtained by using the rubber composition.

DESCRIPTION OF EMBODIMENTS

\<Ring-Opened Copolymer\>

The ring-opened copolymer according to the present invention contains structural units derived from a norbornene compound represented by General Formula (1) below and structural units derived from a monocyclic olefin.

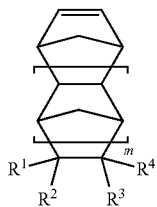

(1)

(In the formula, $R^1$ to $R^4$ are each a hydrogen atom, a linear hydrocarbon group having 1 to 20 carbon atoms, or a substituent containing a halogen atom, a silicon atom, an oxygen atom, or a nitrogen atom, and "m" is 0 or 1).

Specific examples of the norbornene compound represented by General Formula (1) include the following compounds:

bicyclo[2.2.1]hept-2-enes having no substituents or having a linear hydrocarbon substituent, such as 2-norbornene, 5-methyl-2-norbornene, 5-ethyl-2-norbornene, 5-butyl-2-norbornene, 5-hexyl-2-norbornene, 5-decyl-2-norbornene, 5-ethylidene-2-norbornene, 5-vinyl-2-norbornene, and 5-propenyl-2-norbornene;

bicyclo[2.2.1]hept-2-enes having an alkoxycarbonyl group, such as methyl 5-norbornene-2-carboxylate, ethyl 5-norbornene-2-carboxylate, methyl 2-methyl-5-norbornene-2-carboxylate, and ethyl 2-methyl-5-norbornene-2-carboxylate;

bicyclo[2.2.1]hept-2-enes having a hydroxycarbonyl group, such as 5-norbornene-2-carboxylic acid and 5-norbornene-2,3-dicarboxylic acid;

bicyclo[2.2.1]hept-2-enes having a hydroxyl group, such as 5-hydroxy-2-norbornene, 5-hydroxymethyl-2-norbornene, 5,6-di(hydroxymethyl)-2-norbornene, 5,5-di(hydroxymethyl)-2-norbornene, 5-(2-hydroxyethoxycarbonyl)-2-norbornene, and 5-methyl-5-(2-hydroxyethoxycarbonyl)-2-norbornene;

bicyclo[2.2.1]hept-2-enes having a hydrocarbonyl group, such as 5-norbornene-2-carbaldehyde;

bicyclo[2.2.1]hept-2-enes having an alkoxycarbonyl group and a hydroxycarbonyl group, such as 3-methoxycarbonyl-5-norbornene-2-carboxylic acid;

bicyclo[2.2.1]hept-2-enes having a carbonyloxy group, such as 5-norbornene-2-yl acetate, 2-methyl-5-norbornene-2-yl acetate, 5-norbornene-2-yl acrylate, and 5-norbornene-2-yl methacrylate;

bicyclo[2.2.1]hept-2-enes having a nitrogen-containing functional group, such as 5-norbornene-2-carbonitrile and 5-norbornene-2-carboxyamide;

bicyclo[2.2.1]hept-2-enes having a halogen atom, such a 5-chloro-2-norbornene; and bicyclo[2.2.1]hept-2-enes having a silicon atom-containing functional group, such as 5-trimethoxysilyl-2-norbornene and 5-triethoxysilyl-2-norbornene.

The above norbornene compounds represented by General Formula (1) may be used alone or in combination. Preferred norbornene compounds represented by General Formula (1) are those where "m" in General Formula (1) is 0. In General Formula (1), $R^1$ to $R^4$ can be any groups which are not linked together to form a ring, and may be the same or different. $R^1$ to $R^4$ are each preferably a hydrogen atom or an alkyl group having 1 to 3 carbon atoms. Among these, 2-norbornene, 5-methyl-2-norbornene, 5-ethyl-2-norbornene, 5-ethylidene-2-norbornene, and 5-vinyl-2-norbornene are more preferred as the norbornene compound represented by General Formula (1). From the viewpoint of more reliably obtaining the advantages of the present invention, 2-norbornene, 5-methyl-2-norbornene, and 5-ethyl-2-norbornene are more preferred.

The monocyclic olefin may be any olefin having only one ring structure. Examples thereof include, but are not limited to, cyclic monoolefins such as cyclopropene, cyclobutene, cyclopentene, methylcyclopentene, cyclohexene, methylcyclohexene, cycloheptene, and cyclooctene; cyclic diolefins such as cyclohexadiene, methylcyclohexadiene, cyclooctadiene, and methylcyclooctadiene; and the like.

These monocyclic olefins may be used alone or in combination. As the monocyclic olefin, cyclopentene, cyclohexene, cycloheptene, and cyclooctene are preferred. From the viewpoint of more reliably obtaining the advantages of the present invention, cyclopentene and cyclooctene are more preferred.

In the ring-opened copolymer according to the present invention, the proportion of the structural units derived from the norbornene compound to the total repeating structural units is 25 to 90 wt %, preferably 30 to 85 wt %, more preferably 40 to 85 wt %, still more preferably 45 to 85 wt %, particularly preferably 61 to 85 wt %. Too small a proportion of the structural units derived from the norbornene compound results in a cross-linked rubber having poor mechanical strength, elongation properties, and rebound resilience, while too high a proportion of the structural units derived from the norbornene compound results in a cross-linked rubber having poor elongation properties and rebound resilience.

In the ring-opened copolymer according to the present invention, the proportion of the structural units derived from the monocyclic olefin to the total repeating structural units is 10 to 75 wt %, preferably 15 to 70 wt %, more preferably 15 to 60 wt %, still more preferably 15 to 55 wt %, particularly preferably 15 to 39 wt %. Too small a proportion of the structural units derived from the monocyclic olefin results in a cross-linked rubber having poor elongation properties and rebound resilience, while too high a proportion of the structural units derived from the monocyclic olefin results in a cross-linked rubber having poor mechanical strength, elongation properties, and rebound resilience.

The ring-opened copolymer according to the present invention may be a copolymer obtained by copolymerization of the norbornene compound represented by General Formula (1) and the monocyclic olefin with additional monomers copolymerizable with these compounds. Examples of such additional monomers include polycyclic cycloolefins having an aromatic ring, norbornene compounds with three or more rings (excluding the norbornene compounds represented by General Formula (1)), and the like. Examples of the polycyclic cycloolefins having an aromatic ring include phenylcyclooctene, 5-phenyl-1,5-cyclooctadiene, phenylcyclopentene, and the like. Examples of the norbornene compounds with three or more rings (excluding the norbornene compounds represented by General Formula (1)) include dicyclopentadiene, 1,4-methano-1,4,4a,9a-tetrahydro-9H-fluorene, 5-norbornene-2,3-dicarboxylic acid imide, 5-norbornene-2,3-dicarboxylic acid anhydride; and the like. In the ring-opened copolymer according to the present invention, the proportion of structural units derived from the additional monomers to the total repeating structural units is preferably 40 wt % or less, more preferably 30 wt % or less. In the present invention, it is particularly preferable that the copolymer be substantially free from structural units derived from the additional monomers.

The weight average molecular weight (Mw) of the ring-opened copolymer according to the present invention is 100,000 to 1,000,000, preferably 100,000 to 800,000, more preferably 150,000 to 700,000, still more preferably 200,000 to 600,000 as measured against polystyrene standards by gel permeation chromatography. Too low a weight average molecular weight (Mw) results in a cross-linked rubber having poor mechanical strength, elongation properties, and rebound resilience, while monomers having too high a weight average molecular weight (Mw) are difficult to produce and handle. The ratio (Mw/Mn) between the weight average molecular weight (Mw) and the number average molecular weight (Mn) of the ring-opened copolymer according to the present invention measured against polystyrene standards by gel permeation chromatography is preferably 1.0 to 5.0, more preferably 1.5 to 3.0.

The ring-opened copolymer according to the present invention has a cis/trans ratio of 0/100 to 50/50, preferably 5/95 to 45/55, more preferably 10/90 to 40/60, still more preferably 15/85 to 39/61. The cis/trans ratio refers to the ratio of the cis double bond content to the trans double bond content (cis content/trans content) in the repeating units constituting the ring-opened copolymer according to the present invention. Too high a cis/trans ratio results in a cross-linked rubber having poor mechanical strength, elongation properties, and rebound resilience. When the cis/trans ratio is controlled within the above ranges, a cross-linked rubber having excellent mechanical strength, elongation properties, and rebound resilience can be obtained using the ring-opened copolymer according to the present invention.

The ring-opened copolymer according to the present invention has a glass transition temperature (Tg) of preferably −70 to 10° C., more preferably −65 to 0° C., still more preferably −60 to −2° C. When the glass transition temperature (Tg) is controlled within the above ranges, a cross-linked rubber having further enhanced mechanical strength, elongation properties, and rebound resilience can be obtained using the ring-opened copolymer according to the present invention. The glass transition temperature of the ring-opened copolymer can be controlled by selecting the type and the amount of the norbornene compound used, for example.

The ring-opened copolymer according to the present invention may have modifying groups at polymer chain ends. The presence of such modifying groups may further enhance the compatibility with silica. In this case, when the copolymer is combined with silica, the dispersibility of silica in the rubber composition may be enhanced and such enhanced dispersibility may enable production of a cross-linked rubber having further enhanced breaking strength and abrasion resistance. Although not particularly limited, the modifying groups introduced to polymer chain ends are preferably modifying groups containing an atom selected from the group consisting of atoms of the Group 15 elements in the periodic table, atoms of the Group 16 elements in the periodic table, and a silicon atom.

Preferred modifying groups for forming the terminal modifying groups are modifying groups containing an atom selected from the group consisting of a nitrogen atom, an oxygen atom, a phosphorus atom, a sulfur atom, and a silicon atom because such groups can enhance the compatibility with silica and such enhanced compatibility enables production of a cross-linked rubber having much better breaking strength and abrasion resistance. Among these, modifying groups containing an atom selected from the group consisting of a nitrogen atom, an oxygen atom, and a silicon atom are more preferred.

Examples of modifying groups containing a nitrogen atom include amino, pyridyl, imino, amido, nitro, and urethane bond groups, and hydrocarbon groups containing these groups. Examples of modifying groups containing an oxygen atom include hydroxyl, carboxylic acid, ether, ester, carbonyl, aldehyde, and epoxy groups, and hydrocarbon groups containing these groups. Examples of modifying groups containing a silicon atom include alkylsilyl and oxysilyl groups, and hydrocarbon groups containing these groups. Examples of modifying groups containing a phosphorus atom include phosphoric acid and phosphino groups, and hydrocarbon groups containing these groups. Examples of modifying groups containing a sulfur atom include sulfonyl, thiol, and thioether groups, and hydrocarbon groups containing these groups. Alternatively, modifying groups containing two or more of the above groups may be used. Among these, amino, pyridyl, imino, amido, hydroxyl, carboxylic acid, aldehyde, epoxy, and oxysilyl groups, and hydrocarbon groups containing these groups can be specifically mentioned as particularly preferred examples of the modifying groups from the viewpoint of producing a cross-linked rubber having further enhanced breaking strength and abrasion resistance. From the viewpoint of the compatibility with silica, oxysilyl groups are particularly preferred. The "oxysilyl group" refers to a group containing a silicon-oxygen bond.

Specific examples of the oxysilyl groups include alkoxysilyl, aryloxysilyl, acyloxy, alkylsiloxysilyl, and arylsiloxysilyl groups, and the like. Other examples thereof include hydroxylsilyl groups resulting from hydrolysis of alkoxysilyl, aryloxysilyl, and acyloxy groups. Among these, aryloxysilyl groups are preferable from the viewpoint of the compatibility with silica.

The "alkoxysilyl group" refers to a group containing at least one alkoxy group linked to a silicon atom. Specific examples thereof include trimethoxysilyl, (dimethoxy)(methyl) silyl, (methoxy) (dimethyl) silyl, (methoxy) (dichloro) silyl, triethoxysilyl, (diethoxy) (methyl) silyl, (ethoxy) (dimethyl) silyl, (dimethoxy) (ethoxy) silyl, (methoxy) (diethoxy)silyl, and tripropoxysilyl groups, and the like.

The degree of introduction of modifying groups to polymer chain ends of the ring-opened copolymer according to the present invention is expressed as a percentage of the number of ring-opened copolymer chain ends to which modifying groups are introduced relative to the total number of ring-opened copolymer chain ends, and is preferably 10% or more, more preferably 20% or more, still more preferably 30% or more, particularly preferably 40% or more, although not particularly limited thereto. A higher degree of introduction of modification groups is preferable because such a value indicates higher compatibility with silica, which is used as a filler in rubber materials for tires, and leads to a higher heat build-up reducing effect. The degree of introduction of modification groups to polymer chain ends can be measured by any method. For example, in the case where an oxysilyl group is introduced as the terminal modifying group, the degree can be determined from the peak area ratio corresponding to oxysilyl group determined by $^1$H-NMR and the number average molecular weight determined by gel permeation chromatography.

The ring-opened copolymer according to the present invention has a Mooney viscosity (ML1+4, 100° C.) of preferably 20 to 150, more preferably 22 to 120, still more preferably 25 to 90. By controlling the Mooney viscosity within the above ranges, easier kneading at ordinary and high temperatures can be ensured, thereby ensuring better workability.

<Method for Producing Ring-Opened Copolymer>

The ring-opened copolymer according to the present invention can be produced by any method. Examples of such methods include, but are not limited to, copolymerization of the norbornene compound represented by General Formula (1) and the monocyclic olefin in the presence of a ring-opening polymerization catalyst.

The ring-opening polymerization catalyst catalyzes ring-opening copolymerization of the norbornene compound represented by General Formula (1) and the monocyclic olefin, and is preferably a ruthenium-carbene complex because of its ability to control the cis/trans ratio within the ranges mentioned above.

Specific examples of the ruthenium-carbene complex include bis(tricyclohexylphosphine)benzylidene ruthenium dichloride, bis (triphenylphosphine)-3,3-diphenylpropenylidene ruthenium dichloride, bis (tricyclohexylphosphine) t-butylvinylidene ruthenium dichloride, dichloro-(3-phenyl-1H-inden-1-ylidene)bis (tricyclohexylphosphine) ruthenium, bis (1,3-diisopropylimidazolin-2-ylidene)benzylidene ruthenium dichloride, bis(1,3-dicyclohexylimidazolin-2-ylidene)benzylidene ruthenium dichloride, (1,3-dimesityl-imidazolin-2-ylidene) (tricyclohexylphosphine)benzylidene ruthenium dichloride, (1,3-dimesitylimidazolidin-2-ylidene) (tricyclohexylphosphine)benzylidene ruthenium dichloride, bis (tricyclohexylphosphine) ethoxymethylidene ruthenium dichloride, (1,3-dimesitylimidazolidin-2-ylidene) (tricyclohexylphosphine) ethoxymethylidene ruthenium dichloride, and the like. These ring-opening polymerization catalysts may be used alone or in any mixture thereof.

The amount of the ring-opening polymerization catalyst to be used is expressed as a molar ratio (ring-opening polymerization catalyst:monomers used in copolymerization), and is in the range of typically 1:500 to 1:2,000,000, preferably 1:700 to 1:1,500,000, more preferably 1:1,000 to 1:1,000,000.

The polymerization reaction may be performed in the absence of a solvent or in a solution. In the case of copolymerization in a solution, the solvent used may be any solvent which is inert during the polymerization reaction and can dissolve compounds used in the copolymerization including the norbornene compound represented by General Formula (1), the monocyclic olefin, and the polymerization catalyst. Preferred are hydrocarbon-based solvents and halogen-containing solvents. Specific examples of the hydrocarbon-based solvents include aromatic hydrocarbons such as benzene, toluene, xylene, and ethylbenzene; aliphatic hydrocarbons such as hexane, n-heptane, and n-octane; alicyclic hydrocarbons such as cyclohexane, cyclopentane, and methylcyclohexane; and the like. Specific examples of the halogen-containing solvents include haloalkanes such as dichloromethane and chloroform; aromatic halogens such as chlorobenzene and dichlorobenzene; and the like. These solvents may be used alone or in combination.

In the process of ring-opening polymerization of the norbornene compound represented by General Formula (1) and the monocyclic olefin, in order to adjust the molecular weight of the resulting ring-opened copolymer, an olefin compound or a diolefin compound may be optionally added as a molecular weight modifier to the polymerization system.

The olefin compound may be any organic compound having an ethylenically unsaturated bond. Examples thereof include, but are not limited to, α-olefins such as 1-butene, 1-pentene, 1-hexene, and 1-octene; styrene compounds such as styrene and vinyltoluene; halogen-containing vinyl compounds such as acryl chloride; vinyl ethers such as ethyl vinyl ether and i-butyl vinyl ether; silicon-containing vinyl compounds such as allyltrimethoxysilane, allyltriethoxysilane, allyltrichlorosilane, and styryltrimethoxysilane; disubstituted olefins such as 2-butene and 3-hexene; and the like.

Examples of the diolefin compound include non-conjugated diolefins such as 1,4-pentadiene, 1,4-hexadiene, 1,5-hexadiene, 1,6-heptadiene, 2-methyl-1,4-pentadiene, and 2,5-dimethyl-1,5-hexadiene.

The amount of the olefin compound or the diolefin compound used as the molecular weight modifier can be appropriately selected according to the molecular weight of the resulting ring-opened copolymer, and the amount thereof expressed as a molar ratio to the monomers used in copolymerization is typically 1/100 to 1/100,000, preferably 1/200 to 1/50,000, more preferably 1/500 to 1/10,000.

In the case where the ring-opened copolymer according to the present invention is prepared as a copolymer having modifying groups at polymer chain ends, a modifying group-containing olefinically unsaturated hydrocarbon compound is preferably used as a molecular weight modifier instead of the olefin compound and the diolefin compound. In the presence of such a modifying group-containing olefinically unsaturated hydrocarbon compound, the copolymerization can result in a ring-opened copolymer in which the modifying group is suitably introduced to polymer chain ends.

The modifying group-containing olefinically unsaturated hydrocarbon compound may be any compound having the modifying group and one metathesis polymerizable olefinic carbon-carbon double bond, although not particularly limited thereto. For example, in order to introduce oxysilyl groups to polymer chain ends of the ring-opened copolymer, an oxysilyl group-containing olefinically unsaturated hydrocarbon is added to the polymerization reaction system.

As examples of such oxysilyl group-containing olefinically unsaturated hydrocarbons, the following compounds can be mentioned. Hydrocarbons for introducing the modifying group to only one end (single end) of the polymer chains of the monocyclic olefin ring-opening polymer include alkoxysilane compounds such as vinyl (trimethoxy) silane, vinyl (triethoxy) silane, allyl (trimethoxy) silane, allyl (methoxy) (dimethyl) silane, allyl (triethoxy) silane, allyl (ethoxy) (dimethyl) silane, styryl (trimethoxy) silane, styryl (triethoxy) silane, styrylmethyl (triethoxy) silane, allyl(triethoxysilylmethyl)ether, and allyl(triethoxysilylmethyl) (ethyl)amine; aryloxysilane compounds such as vinyl (triphenoxy) silane, allyl (triphenoxy) silane, and allyl (phenoxy) (dimethyl) silane; acyloxysilane compounds such as vinyl(triacetoxy)silane, allyl(triacetoxy)silane, allyl(diacetoxy)methylsilane, and allyl(acetoxy) (dimethyl)silane; alkylsiloxysilane compounds such as allyltris(trimethylsiloxy)silane; arylsiloxysilane compounds such as allyltris(triphenylsiloxy)silane; polysiloxane compounds such as 1-allylheptamethyltrisiloxane, 1-allylnonamethyltetrasiloxane, 1-allylnonamethylcyclopentasiloxane, and 1-allylundecamethylcyclohexasiloxane; and the like.

Hydrocarbons for introducing the modifying group to both polymer chain ends (both ends) of the monocyclic olefin ring-opening polymer include alkoxysilane compounds such as bis(trimethoxysilyl)ethylene, bis(triethoxysilyl)ethylene, 1,4-bis(trimethoxysilyl)-2-butene, 1,4-bis(triethoxysilyl)-2-butene, and 1,4-bis(trimethoxysilylmethoxy)-2-butene; aryloxysilane compounds such as 1,4-bis(triphenoxysilyl)-2-butene; acyloxysilane compounds such as 1,4-bis(triacetoxysilyl)-2-butene; alkylsiloxysilane compounds such as 1,4-bis[tris(trimethylsiloxy)silyl]-2-butene; arylsiloxysilane compounds such as 1,4-bis[tris(triphenylsiloxy)silyl]-2-butene; polysiloxane compounds such as 1,4-bis(heptamethyltrisiloxy)-2-butene, and 1,4-bis(undecamethylcyclohexasiloxy)-2-butene; and the like.

The modifying group-containing olefinically unsaturated hydrocarbon compounds such as oxysilyl group-containing olefinically unsaturated hydrocarbons not only act to introduce the modifying group to polymer chain ends of the ring-opened copolymer but also act as molecular weight modifiers. Due to this nature, the amount of the modifying group-containing olefinically unsaturated hydrocarbon compound to be used can be appropriately selected according to the molecular weight of the resulting ring-opened copolymer, and the amount thereof expressed as a molar ratio to the monomers used in copolymerization is in the range of typically 1/100 to 1/100,000, preferably 1/200 to 1/50,000, more preferably 1/500 to 1/10,000.

The polymerization temperature is preferably −100° C. or higher, more preferably −50° C. or higher, still more preferably 0° C. or higher, particularly preferably 20° C. or higher, although not particularly limited thereto. The upper limit of the polymerization temperature is preferably lower than 120° C., more preferably lower than 100° C., still more preferably lower than 90° C., particularly preferably 80° C. or lower, although not particularly limited thereto. Although the polymerization reaction time is also not particularly limited, it is preferably 1 minute to 72 hours, more preferably 10 minutes to 20 hours.

To the ring-opened copolymer obtained by the polymerization reaction may be optionally added an antioxidant such as a phenol-based stabilizer, a phosphorus-based stabilizer, or a sulfur-based stabilizer. The amount of the antioxidant to be added can be determined according to factors such as the type thereof. Additionally, an extender oil may also be added if needed. In the case where the ring-opened copolymer is prepared as a polymer solution, any known recovery method can be used to recover the ring-opened copolymer from the polymer solution. Examples of such methods include a method involving removing the solvent by steam stripping or the like, filtering out the solid, and drying the residue to afford the ring-opened copolymer as a solid; and the like.

<Rubber Composition>

In the rubber composition according to the present invention, necessary amounts of compounding agents such as a cross-linking agent, a cross-linking accelerator, a cross-linking activator, a filler other than silica, an antioxidant, an activator, a process oil, a plasticizer, and a lubricant may be added to the above-described ring-opened copolymer according to the present invention in a conventional manner.

Examples of the cross-linking agent include sulfurs such as powdered sulfur, precipitated sulfur, colloidal sulfur, insoluble sulfur, and highly dispersible sulfur; halogenated sulfurs such as sulfur monochloride and sulfur dichloride; organic peroxides such as dicumyl peroxide and ditertiary butyl peroxide; quinone dioximes such as p-quinone dioxime and p,p'-dibenzoylquinone dioxime; organic polyvalent amine compounds such as triethylenetetramine, hexamethylenediamine carbamate, and 4,4'-methylene bis-o-chloroaniline; alkylphenol resins having a methylol group; and the like. Among these, sulfurs are preferred, and powdered sulfur is more preferred. These cross-linking agents are used alone or in combination. The amount of the cross-linking agent to be added is preferably 0.1 to 15 parts by weight, more preferably 0.5 to 5 parts by weight relative to 100 parts by weight of rubber components in the rubber composition.

Examples of the cross-linking accelerator include sulfenamide-based cross-linking accelerators such as N-cyclohexyl-2-benzothiazolylsulfenamide, N-t-butyl-2-benzothiazolylsulfenamide, N-oxyethylene-2-benzothiazolylsulfenamide, N-oxyethylene-2-benzothiazolylsulfenamide, and N,N'-diisopropyl-2-benzothiazolylsulfenamide; guanidine-based cross-linking accelerators such as 1,3-diphenylguanidine, 1,3-di-ortho-tolylguanidine, and 1-ortho-tolylbiguanidine; thiourea-based cross-linking accelerators such as diethylthiourea; thiazole-based cross-linking accelerators such as 2-mercaptobenzothiazole, dibenzothiazyl disulfide, and zinc 2-mercaptobenzothiazole; thiuram-based cross-linking accelerators such tetramethylthiuram monosulfide and tetramethylthiuram disulfide; dithiocarbamic acid-based cross-linking accelerators such as sodium dimethyldithiocarbamate and zinc diethyldithiocarbamate; xanthogenic acid-based cross-linking accelerators such as sodium isopropyl xanthate zinc isopropyl xanthate, and zinc butyl xanthate; and the like. Among these, those containing sulfenamide-based cross-linking accelerators are particularly preferable. These cross-linking accelerators are used alone or in combination. The amount of the cross-linking accelerator to be added is preferably 0.1 to 15 parts by weight, more preferably 0.5 to 5 parts by weight relative to 100 parts by weight of the rubber components in the rubber composition.

As the cross-linking activator, a higher fatty acid such as stearic acid, zinc oxide, or the like can be used. The amount of the cross-linking activator to be added can be appropriately selected. In the case of a higher fatty acid, the amount thereof to be added is preferably 0.05 to 15 parts by weight, more preferably 0.5 to 5 parts by weight relative to 100 parts by weight of the rubber components in the rubber composition. In the case of zinc oxide, the amount thereof to be added is preferably 0.05 to 10 parts by weight, more preferably 0.5 to 3 parts by weight relative to 100 parts by weight of the rubber components in the rubber composition.

As the process oil, a mineral oil or a synthetic oil may be used. As the mineral oil, an aroma oil, a naphthenic oil, a paraffin oil, or the like is typically used. Examples of other compounding agents include activators such as diethylene glycol, polyethylene glycol, and silicone oil; fillers other than silica such as carbon black, calcium carbonate, talc, and clay; tackifiers such as a petroleum resin and coumarone resin; waxes; and the like.

The rubber composition according to the present invention may further contain silica.

Examples of silica include, but are not limited to, dry process white carbon, wet process white carbon, colloidal silica, precipitated silica, and the like. Further, a carbon-silica dual phase filler comprising carbon black and silica supported on the surface thereof may be used. Preferred among these is wet process white carbon mainly composed of hydrous silicic acid. These may be used alone or in combination.

The silica preferably has a nitrogen adsorption specific surface area of 50 to 300 m$^2$/g, more preferably 80 to 220 m$^2$/g, particularly preferably 100 to 170 m$^2$/g. Silica having a specific surface area within these ranges has a particularly preferable level of compatibility with the ring-opening copolymer. Further, the pH of the silica is preferably less than 7, more preferably 5 to 6.9. Note that the nitrogen adsorption specific surface area can be measured in accordance with ASTM D3037-81 by the BET method.

The amount of the silica in the rubber composition according to the present invention is preferably 1 to 150 parts by weight, more preferably 10 to 120 parts by weight, further preferably 15 to 100 parts by weight, particularly preferably 20 to 80 parts by weight relative to 100 parts by weight of the rubber components including the ring-opening copolymer according to the present invention in the rubber composition. Control of the amount of the silica within the above ranges results in a cross-linked rubber having further appropriately enhanced breaking strength and abrasion resistance.

In the rubber composition according to the present invention, a silane coupling agent is preferably further mixed to further enhance the compatibility between the ring-opening copolymer and the silica. Examples of the silane coupling agent include vinyltriethoxysilane, β-(3,4-epoxycyclohexyl) ethyltrimethoxysilane, N-(β-aminoethyl)-γ-aminopropyltrimethoxysilane, bis (3-(triethoxysilyl) propyl) tetrasulfide, and bis(3-(triethoxysilyl)propyl)disulfide; and tetrasulfides described in Japanese Patent Laid-Open No. 6-248116, such as γ-trimethoxysilylpropyldimethylthiocarbamyl tetrasulfide and γ-trimethoxysilylpropylbenzothiazyl tetrasulfide. Among these, the tetrasulfides are preferable. These silane coupling agents may be used alone or in combination. The amount of the silane coupling agent to be added is preferably 0.1 to 30 parts by weight, more preferably 1 to 15 parts by weight relative to 100 parts by weight of the silica.

Further, the rubber composition according to the present invention may further contain rubbers other than the ring-opening copolymer according to the present invention as rubber components. Examples of such rubbers other than the ring-opening copolymer according to the present invention include natural rubber (NR), polyisoprene rubber (IR), emulsion polymerized SBR (styrene-butadiene copolymer rubber), solution polymerized random SBR (bound styrene: 5 to 50 wt %, 1,2-bond content in butadiene units: 10 to 80%), high trans SBR (trans bond content in butadiene units: 70 to 95%), low cis BR (polybutadiene rubber), high cis BR, high trans BR (trans bond content in butadiene units: 70 to 95%), styrene-isoprene copolymer rubber, butadiene-isoprene copolymer rubber, emulsion polymerized styrene-acrylonitrile-butadiene copolymer rubber, acrylonitrile-butadiene copolymer rubber, high vinyl SBR-low vinyl SBR block copolymer rubber, polyisoprene-SBR block copolymer rubber, polystyrene-polybutadiene-polystyrene block copolymer, acrylic rubber, epichlorohydrin rubber, fluororubber, silicon rubber, ethylene-propylene rubber, urethane rubber, and the like. Among these, NR, BR, IR, and SBR are preferably used. These rubbers can be used alone or in combination.

The content of the ring-opening copolymer in the rubber composition according to the present invention is preferably 10 wt % or more, more preferably 20 wt % or more, particularly preferably 30 wt % or more relative to the total rubber components. Too low a content thereof may not be effective in enhancing breaking strength and abrasion resistance.

The rubber composition according to the present invention can be obtained by kneading the components by an ordinary method. For example, the rubber composition can be obtained by kneading the compounding agents other than the cross-linking agent and the cross-linking accelerator with the rubber components including the ring-opening copolymer, and then by mixing the cross-linking agent and the cross-linking accelerator with the kneaded product. The kneading temperature of the compounding agents other than the cross-linking agent and the cross-linking accelerator with the rubber components including the ring-opening copolymer is preferably 80 to 200° C., more preferably 120 to 180° C., and the kneading time is preferably 30 seconds to 30 minutes. The cross-linking agent and the cross-linking accelerator are added after cooling the kneaded product to typically 100° C. or lower, preferably to 80° C. or lower.

<Cross-Linked Rubber>

The cross-linked rubber according to the present invention is obtained by cross-linking the above-described rubber composition according to the present invention.

The cross-linked rubber according to the present invention can be produced using the rubber composition according to the present invention, for example, by molding with a molding machine enabling molding into a desired shape such as an extruding machine, an injection molding machine, a compressor and a roll, performing a cross-linking reaction by heating, and fixing the shape as a cross-linked product. In this case, the cross-linking may be performed after performing molding beforehand, or simultaneously with the molding. The molding temperature is typically 10 to 200° C., and preferably 25 to 120° C. The cross-linking temperature is typically 100 to 200° C., preferably 130 to 190° C.; the cross-linking time is typically 1 minute to 24 hours, preferably 2 minutes to 12 hours, particularly preferably 3 minutes to 6 hours.

Depending on the shape, the size, and the like thereof, the inside of the cross-linked rubber may not be sufficiently cross-linked even when the surface thereof is cross-linked. To avoid this, the cross-linked rubber may be further heated for secondary cross-linking.

As a heating method, a common method used to cross-link rubber such as press heating, steam heating, oven heating, or hot air heating can be appropriately selected.

The cross-linked rubber according to the present invention thus obtained has excellent mechanical strength, elongation properties, and rebound resilience. Due to these properties, the cross-linked rubber according to the present invention can be used, for example, in the following various applications: materials for tire parts in tires such as cap treads, base treads, carcasses, side walls, and beads; materials for various industrial products such as hoses, belts, mats, antivibration rubber, and others; rebound resilience improvers for resins; resin film buffers; shoe soles; rubber shoes; golf balls; toys; and the like. Additionally, the cross-linked rubber according to the present invention can be suitably used in tire parts such as treads, carcasses, side walls, and beads in various tires such as all-season tires, high-performance tires, and studless tires. In particular, the cross-lined rubber according to the present invention can be suitably used as shoe soles.

EXAMPLES

The present invention is hereinafter illustrated in greater detail with reference to Examples. However, the present invention should not be construed as limited to these examples. In the following examples, all "part(s)" are on a weight basis unless otherwise indicated. Tests and evaluations were performed according to the following methods.

<Molecular Weight>

The number average molecular weight (Mn), the weight average molecular weight (Mw), and the molecular weight distribution (Mw/Mn) of each ring-opened copolymer were determined as values measured against polystyrene standards by gel permeation chromatography (GPC) using tetrahydrofuran as a solvent. The measurement apparatus used was HLC-8320GPC (available from TOSOH CORPORA- TION). Using four columns TSKgel SuperMultipore HZ-H (available from TOSOH CORPORATION) connected in series, the measurement was performed at a flow rate of 0.35 ml/min, a sample feed rate of 10 μml, and a column temperature of 40° C.

<Proportions of Norbornene Compound Structural Units and Monocyclic Olefin Structural Units>

The proportions of the constituent monomers in each ring-opened copolymer were determined by $^1$H-NMR spectrometry. Specifically, $^1$H-NMR spectrometry was performed using deuterated chloroform as a solvent, and the proportions were determined based on the integration ratio between a double bond signal at 5.0 to 5.5 ppm and a signal derived from the norbornene compound at 2.3 to 3.0 ppm.

<Cis/Trans Ratio of Double Bonds in Main Chain>

The cis/trans ratio of double bonds in the main chain of each ring-opened copolymer was determined by $^{13}$C-NMR spectrometry. Specifically, $^{13}$C-NMR spectrometry was performed using deuterated chloroform as a solvent, and the cis/trans ratio was determined based on the integration ratios between signals indicating the cis configurations at around 134.0 ppm (derived from chains consisting of norbornene compound structural units), at around 130.0 ppm (derived from chains consisting of monocyclic olefin structural units), and at around 135.4 ppm (derived from norbornene compound structural unit-monoolefin structural unit alternating chains) and signals indicating the trans configurations at around 133.0 ppm (derived from chains consisting of norbornene compound structural units), at around 130.5 ppm (derived from chains consisting of monocyclic olefin structural units), and at around 128.4 ppm (derived from norbornene compound unit-monoolefin structural unit alternating chains).

<Glass Transition Temperature (Tg)>

The glass transition temperature of each ring-opened copolymer was measured with a differential scanning calorimeter (DSC) at a temperature increase rate of 10° C./min.

<Tensile Test>

Each rubber composition sample was cross-linked by pressing at 160° C. for 20 minutes to prepare a test piece, and a dumbbell-shaped test piece in the shape of dumbbell No. 6 was punched out from the resulting cross-linked sheet in the direction parallel to the grain direction. The dumbbell-shaped test piece was assessed for tensile strength and elongation at break (hereinafter, referred to as elongation) by a tensile test using a tensile tester (product name "TENSC-METER 10K", available from ALPHA TECHNOLOGIES, load cell 1 kN) at 23° C. at 500 mm/min in accordance with JIS K 6251:2010.

<Rebound Resilience Test>

Each rubber composition sample was press-molded in a mold under pressure at 160° C. for 25 minutes, thereby obtaining a cylindrical cross-linked rubber having a diameter of 29 mm and a thickness of 12.5 mm. The resulting cylindrical cross-linked rubber was measured for rebound resilience using a Lupke rebound resilience tester (KOBUN-SHI KEIKI CO., LTD.) at 23° C. at a holding force of 29 to 39 N in according with JIS K 6255:1996.

Example 1

Under a nitrogen atmosphere, 100 parts of 2-norbornene (NB) as a norbornene compound, 100 parts of cyclopentene (CPE) as a monocyclic olefin, 394 parts of toluene, and 0.24 parts of 1-hexene were placed in a glass reactor with a stirrer. Subsequently, 0.012 parts of dichloro-(3-phenyl-1H-inden-1-ylidene)bis(tricyclohexylphosphine)ruthenium (II) dissolved in 10 parts of toluene was added thereto to cause the polymerization reaction to proceed at room temperature for 4 hours. After the polymerization reaction, an excess of vinyl ethyl ether was added to terminate the polymerization reaction.

The polymer solution was poured into a large excess of methanol containing 2,6-di-t-butyl-p-cresol (BHT), and the precipitated polymer was collected and washed with methanol, and was then vacuum dried at 50° C. for 3 days to afford 124 parts of a ring-opened copolymer. The resulting ring-opened copolymer had a number average molecular weight (Mn) of 155,000, a weight average molecular weight (Mw) of 365,000, a 2-norbornene structural unit/cyclopentene structural unit ratio of 72/28 (on a weight basis), a cis/trans ratio of 17/83, and a glass transition temperature (Tg) of –4° C.

100 Parts of the ring-opened copolymer prepared above was masticated using a 250 ml Banbury mixer. Next, 50 parts of silica (product name "Zeosil 1165MP", available from Rhodia, nitrogen adsorption specific surface area (BET method): 163 m$^2$/g), 8 parts of process oil (product name "Aromax T-DAE", available from JX Nikko Nisseki Energy Co., Ltd.), and 3 parts of a silane coupling agent (bis(3-(triethoxysilyl) propyl)tetrasulfide, product name "Si69", available from Degussa) were added thereto, and the mixture was kneaded at a starting temperature of 110° C. for 1.5 minutes. To the kneaded product were added 3 parts of zinc oxide (zinc flower No. 1), 2.0 parts of stearic acid (product name "SA-300", available from Adeka corporation), and 2.0 parts of an antioxidant (N-phenyl-N'-(1,3-dimethylbutyl)-p-phenylenediamine, product name "NOCLAK 6C", available from Ouchi Shinko Chemical Industrial Co., LTD.). The resulting mixture was kneaded for 2.5 minutes, and the resulting rubber composition was discharged from the Banbury mixer. When the kneading was completed, the temperature of the rubber composition was 150° C. After cooled to room temperature, the rubber composition was kneaded again in the Banbury mixer for 3 minutes, and was then discharged from the Banbury mixer. Next, by using an open roll mixer at 50° C., the obtained rubber composition, 1.5 parts of sulfur, and 0.9 parts of a cross-linking accelerator (di-2-benzothiazolyldisulfide, available from Ouchi Shinko Chemical Co., Ltd., product name "Nocceler-DM"), 0.6 parts of a cross-linking accelerator (1,3-di-o-tolylguanidine, available from Ouchi Shinko Chemical Co., Ltd., product name "Nocceler-DT"), and 0.1 parts of tetramethylthiuram monosulfide (available from Ouchi Shinko Chemical Co., Ltd., product name "Nocceler TS") were kneaded, and then a sheet-like rubber composition was prepared. The obtained rubber composition was evaluated for tensile strength, elongation, and rebound resilience according to the methods described above. The results are shown in Table 1. The evaluated properties were expressed as indices relative to those of the test piece of Comparative Example 1 as a reference sample (each index: 100).

Example 2

194 Parts of a ring-opened copolymer was prepared in the same manner as in Example 1 except that 120 parts of 2-norbornene as a norbornene compound, 80 parts of cyclooctene (COE) as a monocyclic olefin, and 0.34 parts of 1-hexene were used. The resulting ring-opened copolymer had a number average molecular weight (Mn) of 103,000, a weight average molecular weight (Mw) of 249,000, a 2-nor-bornene structural unit/cyclooctene structural unit ratio of 59/41 (on a weight basis), a cis/trans ratio of 18/82, and a glass transition temperature (Tg) of −32° C.

Using the ring-opened copolymer prepared above, a rubber composition was prepared in the same manner as in Example 1. The resulting rubber composition was evaluated for tensile strength, elongation, and rebound resilience in accordance with the methods described above. The results are shown in Table 1. The evaluated properties were expressed as indices relative to those of the test piece of Comparative Example 1 as the reference sample (each index: 100).

Example 3

175 Parts of a ring-opened copolymer was prepared in the same manner as in Example 1 except that 150 parts of 5-ethyl-2-norbornene (EtNB) as a norbornene compound, 50 parts of cyclopentene as a monocyclic olefin, and 0.20 parts of 1-hexene were used. The resulting ring-opened copolymer had a number average molecular weight (Mn) of 185,000, a weight average molecular weight (Mw) of 402,000, a 5-ethyl-2-norbornene structural unit/cyclopentene structural unit ratio of 81/19 (on a weight basis), a cis/trans ratio of 21/79, and a glass transition temperature (Tg) of −18° C.

Using the ring-opened copolymer prepared above, a rubber composition was prepared in the same manner as in Example 1. The resulting rubber composition was evaluated for tensile strength, elongation, and rebound resilience in accordance with the methods described above. The results are shown in Table 1. The evaluated properties were expressed as indices relative to those of the test piece of Comparative Example 1 as the reference sample (each index: 100).

Example 4

Under a nitrogen atmosphere, 100 parts of 2-norbornene (NB) as a norbornene compound, 100 parts of cyclopentene (CPE) as a monocyclic olefin, 394 parts of toluene, and 0.12 parts of 1-hexene were placed in a glass reactor provided with a stirrer. Subsequently, 0.006 parts of (1,3-dimesityl-imidazolidin-2-ylidene) (tricyclohexylphosphine)benzylidene ruthenium dichloride dissolved in 10 parts of toluene was added thereto to cause the polymerization reaction to proceed at room temperature for 4 hours. After the polymerization reaction, an excess of vinyl ethyl ether was added to terminate the polymerization reaction.

The polymer solution was poured into a large excess of methanol containing 2,6-di-t-butyl-p-cresol (BHT), and the precipitated polymer was collected and washed with methanol, and was then vacuum dried at 50° C. for 3 days to afford 160 parts of a ring-opened copolymer. The resulting ring-opened copolymer had a number average molecular weight (Mn) of 122,000, a weight average molecular weight (Mw) of 268,000, a 2-norbornene structural unit/cyclopentene structural unit ratio of 62/38 (on a weight basis), a cis/trans ratio of 35/65, and a glass transition temperature (Tg) of −25° C.

Using the ring-opened copolymer prepared above, a rubber composition was prepared in the same manner as in Example 1. The resulting rubber composition was evaluated for tensile strength, elongation, and rebound resilience in accordance with the methods described above. The results are shown in Table 1. The evaluated properties were expressed as indices relative to those of the test piece of Comparative Example 1 as the reference sample (each index: 100).

Example 5

111 Parts of a ring-opened copolymer was prepared in the same manner as in Example 1 except that 40 parts of 2-norbornene as a norbornene compound, 160 parts of cyclopentene as a monocyclic olefin, and 0.20 parts of 1-hexene were used. The resulting ring-opened copolymer had a number average molecular weight (Mn) of 122,000, a weight average molecular weight (Mw) of 275,000, a 2-norbornene structural unit/cyclopentene structural unit ratio of 32/68 (on a weight basis), a cis/trans ratio of 18/82, and a glass transition temperature (Tg) of −55° C.

Using the ring-opened copolymer prepared above, a rubber composition was prepared in the same manner as in Example 1. The resulting rubber composition was evaluated for tensile strength, elongation, and rebound resilience in accordance with the methods described above. The results are shown in Table 1. The evaluated properties were expressed as indices relative to those of the test piece of Comparative Example 1 as the reference sample (each index: 100).

Comparative Example 1

120 Parts of a ring-opened copolymer was prepared in the same manner as in Example 1 except that 20 parts of 2-norbornene as a norbornene compound, 180 parts of cyclopentene as a monocyclic olefin, and 0.17 parts of 1-hexene were used. The resulting ring-opened copolymer had a number average molecular weight (Mn) of 131,000, a weight average molecular weight (Mw) of 283,000, a 2-norbornene structural unit/cyclopentene structural unit ratio of 21/79 (on a weight basis), a cis/trans ratio of 17/83, and a glass transition temperature (Tg) of −75° C.

Using the ring-opened copolymer prepared above, a rubber composition was prepared in the same manner as in Example 1. The resulting rubber composition was evaluated for tensile strength, elongation, and rebound resilience in accordance with the methods described above. The results are shown in Table 1. The evaluated properties were expressed as indices relative to those of the test piece of Comparative Example 1 as the reference sample (each index: 100).

Comparative Example 2

185 Parts of a ring-opened norbornene compound polymer was prepared in the same manner as in Example 1 except that only 200 parts of 2-norbornene as a norbornene compound was used without using any monocyclic olefins, and 0.30 parts of 1-hexene was used. The resulting ring-opened norbornene compound polymer was a polymer consisting of only 2-norbornene structural units and having a number average molecular weight (Mn) of 158,000 and a weight average molecular weight (Mw) of 350,000, and had a cis/trans ratio of 24/76 and a glass transition temperature (Tg) of 31° C.

Using the ring-opened norbornene compound polymer prepared above, a rubber composition was prepared in the same manner as in Example 1. The resulting rubber composition was evaluated for tensile strength, elongation, and rebound resilience in accordance with the methods described above. The results are shown in Table 1. The evaluated properties were expressed as indices relative to those of the test piece of Comparative Example 1 as the reference sample (each index: 100).

Comparative Example 3

97 Parts of a ring-opened copolymer was prepared in the same manner as in Example 1 except that 1.60 parts of 1-hexene was used. The resulting ring-opened copolymer had a number average molecular weight (Mn) of 27,000, a weight average molecular weight (Mw) of 59,000, a 2-norbornene structural unit/cyclopentene structural unit ratio of 68/32 (on a weight basis), a cis/trans ratio of 17/83, and a glass transition temperature (Tg) of −10° C.

Using the ring-opened copolymer prepared above, a rubber composition was prepared in the same manner as in Example 1. The resulting rubber composition was evaluated for tensile strength, elongation, and rebound resilience in accordance with the methods described above. The results are shown in Table 1. The evaluated properties were expressed as indices relative to those of the test piece of Comparative Example 1 as the reference sample (each index: 100).

Reference Example 1

Preparation of solution of diisobutylaluminum mono (n-butoxide) in toluene (2.5 wt %)

Under a nitrogen atmosphere, 88 parts of toluene and 7.8 parts of a 25.4 wt % solution of triisobutylaluminum in n-hexane (available from Tosoh Finechem Corporation) were placed in a glass vessel with a stirring bar. The mixture was cooled to −45° C., and 1.02 parts of n-butanol (molar equivalent to triisobutylaluminum) was slowly added dropwise to the mixture with vigorous stirring. Thereafter, the resulting mixture was left and cooled to room temperature with stirring. Thus, a solution of diisobutylaluminum mono (n-butoxide) in toluene (concentration: 2.5 wt %) was prepared.

Comparative Example 4

Under a nitrogen atmosphere, 8.7 parts of a 1.0% by weight solution of WC1$_6$ in toluene and 4.3 parts of the 2.5% by weight solution of diisobutyl aluminum mono (n-hexoxide) in toluene prepared in Reference Example 1 were placed in a glass reactor, and the mixture was stirred for 10 minutes. Subsequently, 0.039 parts of ethyl acetate was added, and the mixture was stirred for 10 minutes to prepare a catalyst solution. Then, under a nitrogen atmosphere, 100 parts of 2-norbornene as a norbornene compound, 100 parts of cyclopentene as a monocyclic olefin, and 0.35 parts of 1-hexene were placed in a pressure-resistant glass reactor with a stirrer. To this was added 13 parts of the catalyst solution prepared above to cause the polymerization reaction to proceed at 25° C. for 6 hours. After the 6-hour polymerization reaction, an excess of isopropanol was added to the pressure-resistant glass reactor to terminate the polymerization reaction, and the solution in the pressure-resistant reactor was poured into a large excess of isopropanol containing 2,6-di-t-butyl-p-cresol (BHT). The precipitated polymer was collected, washed with methanol, and then vacuum dried at 50° C. for 3 days to afford 115 parts of a ring-opened copolymer. The resulting ring-opened copolymer had a number average molecular weight (Mn) of 134,000, a weight average molecular weight (Mw) of 321,000, a 2-norbornene structural unit/cyclopentene structural unit ratio of 68/32 (on a weight basis), a cis/trans ratio of 65/35, and a glass transition temperature (Tg) of −15° C.

Using the ring-opened copolymer prepared above, a rubber composition was prepared in the same manner as in Example 1. The resulting rubber composition was evaluated for tensile strength, elongation, and rebound resilience in accordance with the methods described above. The results are shown in Table 1. The evaluated properties were expressed as indices relative to those of the test piece of Comparative Example 1 as the reference sample (each index: 100).

Comparative Example 5

124 Parts of a ring-opened copolymer was prepared in the same manner as in Example 1 except that 100 parts of dicyclopentadiene (DCPD) as a norbornene compound was used. The resulting ring-opened copolymer had a number average molecular weight (Mn) of 99,000, a weight average molecular weight (Mw) of 258,000, a dicyclopentadiene structural unit/cyclopentene structural unit ratio of 60/40 (on a weight basis), a cis/trans ratio of 17/83, and a glass transition temperature (Tg) of 34° C.

Using the ring-opened copolymer prepared above, a rubber composition was prepared in the same manner as in Example 1. The resulting rubber composition was evaluated for tensile strength, elongation, and rebound resilience in accordance with the methods described above. The results are shown in Table 1. The evaluated properties were expressed as indices relative to those of the test piece of Comparative Example 1 as the reference sample (each index: 100).

TABLE 1

| | Ring-opened copolymers | | | | | | Cross-linked rubbers | | |
|---|---|---|---|---|---|---|---|---|---|
| | Norbornene compound structural unit | | Monocyclic olefin structural unit | | Weight average molecular | Cis/trans ratio of double bonds in main | Tg | Tensile strength | Elongation | Rebound resilience |
| | Norbornene compound | Proportion (wt %) | Monocyclic olefin | Proportion (wt %) | weight (Mw) | chain | (° C.) | (index) | (index) | (index) |
| Example 1 | NB | 72 | CPE | 28 | 365,000 | 17/83 | −4 | 124 | 125 | 104 |
| Example 2 | NB | 59 | COE | 41 | 249,000 | 18/82 | −32 | 111 | 116 | 103 |
| Example 3 | EtNB | 81 | CPE | 19 | 402,000 | 21/79 | −18 | 128 | 130 | 106 |
| Example 4 | NB | 62 | CPE | 38 | 268,000 | 35/65 | −25 | 119 | 120 | 105 |
| Example 5 | NB | 32 | CPE | 68 | 275,000 | 18/82 | −55 | 106 | 105 | 102 |
| Comparative | NB | 21 | CPE | 79 | 283,000 | 17/83 | −75 | 100 | 100 | 100 |

TABLE 1-continued

| | Ring-opened copolymers | | | | | | | Cross-linked rubbers | | |
|---|---|---|---|---|---|---|---|---|---|---|
| | Norbornene compound structural unit | | Monocyclic olefin structural unit | | Weight average molecular | Cis/trans ratio of double bonds | | Tensile | Rebound | |
| | Norbornene compound | Proportion (wt %) | Monocyclic olefin | Proportion (wt %) | weight (Mw) | in main chain | Tg (° C.) | strength (index) | Elongation (index) | resilience (index) |
| Example 1 | | | | | | | | | | |
| Comparative Example 2 | NB | 100 | — | 0 | 350,000 | 24/76 | 31 | 136 | 92 | 89 |
| Comparative Example 3 | NB | 68 | CPE | 32 | 59,000 | 17/83 | −10 | 63 | 55 | 97 |
| Comparative Example 4 | NB | 68 | CPE | 32 | 321,000 | 65/35 | −15 | 92 | 95 | 97 |
| Comparative Example 5 | DCPD | 60 | CPE | 40 | 258,000 | 17/83 | 34 | 140 | 82 | 73 |

As seen in Table 1, cross-linked rubbers having excellent tensile strength, elongation at break, and rebound resilience could be prepared from the ring-opened copolymers which were each prepared by ring-opening copolymerization of a norbornene compound represented by General Formula (1) and a monocyclic olefin, contained 25 to 90 wt % of structural units derived from the norbornene compound and 10 to 75 wt % of structural units derived from the monocyclic olefin, and had a weight average molecular weight of 100,000 to 1,000,000, and a cis/trans ratio of 0/100 to 50/50. This confirmed that the ring-opened copolymers provided cross-linked rubbers excellent in all of mechanical strength, elongation properties, and rebound resilience, and the cross-linked rubbers were suitable for shoe sole applications (Examples 1 to 5).

In contrast, the ring-opened copolymer containing less than 25 wt % of norbornene compound derived-structural units and more than 75 wt % of monocyclic olefin-derived structural units provided a cross-linked rubber poor in all of mechanical strength, elongation properties, and rebound resilience (Comparative Example 1). The ring-opened copolymer containing more than 90 wt % of norbornene compound derived-structural units and less than 10 wt % of monocyclic olefin structural units provided a cross-linked rubber having poor elongation properties and rebound resilience (Comparative Example 2).

Cross-linking of the ring-opened copolymer having a weight average molecular weight of less than 100,000 resulted in a cross-linked rubber poor in all of mechanical strength, elongation properties, and rebound resilience (Comparative Example 3).

Cross-linking of the ring-opened copolymer having a cis/trans ratio of more than 50/50 resulted in a cross-linked rubber poor in all of mechanical strength, elongation at break, and rebound resilience (Comparative Example 4).

Cross-linking of the ring-opened copolymer prepared by ring-opening copolymerization of a norbornene compound other than the norbornene compound represented by General Formula (1) and a monocyclic olefin resulted in a cross-linked rubber having poor elongation properties and rebound resilience (Comparative Example 5).

The invention claimed is:

1. A ring-opened copolymer comprising structural units derived from a norbornene compound represented by General Formula (1) below and structural units derived from a monocyclic olefin, wherein relative to the total repeating structural units in the ring-opened copolymer, the proportion of the structural units derived from a norbornene compound is 25 to 90 wt %, and the proportion of the structural units derived from a monocyclic olefin is 10 to 75 wt %, the weight average molecular weight of the ring-opened copolymer is 100,000 to 1,000,000, and the cis/trans ratio of the ring-opened copolymer is 0/100 to 50/50,

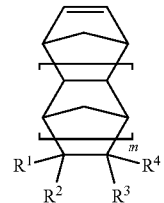

(1)

wherein $R^1$ to $R^4$ are each a hydrogen atom, a linear hydrocarbon group having 1 to 20 carbon atoms, or a substituent containing a halogen atom, a silicon atom, an oxygen atom, or a nitrogen atom, $R_1$ to $R^4$ are not linked together so that $R^1$ to $R^4$ do not form a ring, and "m" is 0.

2. The ring-opened copolymer according to claim 1, wherein the ring-opened copolymer has a glass transition temperature of −70 to 10° C.

3. The ring-opened copolymer according to claim 1, wherein $R^1$ to $R^4$ in General Formula (1) are each a hydrogen atom or an alkyl group having 1 to 3 carbon atoms.

4. The ring-opened copolymer according to claim 1, wherein the monocyclic olefin is at least one selected from the group consisting of cyclopentene, cyclohexene, cycloheptene, and cyclooctene.

5. A rubber composition comprising the ring-opened copolymer according to claim 1.

6. The rubber composition according to claim 5, further comprising a cross-linking agent.

7. A cross-linked rubber obtained by cross-linking the rubber composition according to claim 5.

8. The ring-opened copolymer according to claim 1, wherein the proportion of the structural units derived from a norbornene compound is 30 to 85 wt %, and the proportion of the structural units derived from a monocyclic olefin is 15 to 70 wt %.

9. The ring-opened copolymer according to claim 1, wherein the proportion of the structural units derived from a norbornene compound is 40 to 85 wt %, and the proportion of the structural units derived from a monocyclic olefin is 15 to 60 wt %.

10. The ring-opened copolymer according to claim 1, wherein the proportion of the structural units derived from a norbornene compound is 45 to 85 wt %, and the proportion of the structural units derived from a monocyclic olefin is 15 to 55 wt %.

11. The ring-opened copolymer according to claim 1, wherein the proportion of the structural units derived from a norbornene compound is 61 to 85 wt %, and the proportion of the structural units derived from a monocyclic olefin is 15 to 39 wt %.

12. The ring-opened copolymer according to claim 1, wherein the cis/trans ratio is 5/95 to 45/55.

13. The ring-opened copolymer according to claim 1, wherein the cis/trans ratio is 10/90 to 40/60.

14. The ring-opened copolymer according to claim 1, wherein the cis/trans ratio is 15/85 to 39/61.

15. The ring-opened copolymer according to claim 2, wherein the glass transition temperature is −65 to 0° C.

16. The ring-opened copolymer according to claim 2, wherein the glass transition temperature is −60 to −2° C.

* * * * *